United States Patent Office 2,805,233
Patented Sept. 3, 1957

2,805,233

METAL PHENOLATES AND PROCESS OF PRODUCING SAME

John Barr Bell, Jr., Locust, N. J., assignor to Jefferson Chemical Company, Inc., New York, N. Y., a corporation of Delaware No Drawing. Application November 23, 1953, Serial No. 393,953

4 Claims. (Cl. 260—429)

This invention relates to the production of metal phenolates including the metal alkylphenolates, particularly zinc and cadmium alkylphenolates, and a mixture of zinc or cadmium and alkali or alkaline earth metal alkylphenolates.

Such metal phenolates are useful as additives to lubricating oils to improve the properties thereof, especially their performance in engines manifested in the maintenance of a clean engine condition during operation due in part at least to the detergent properties of such additives and to the prevention or minimizing of piston and combustion chamber deposits.

This invention provides a novel process for producing such metal phenolates, which process results in the production of novel mixed metal salts of the phenol with a low molecular weight aliphatic acid, which mixed metal salts are useful as oil additives and thickeners for aliphatic hydrocarbons or can be converted to metal diphenolates.

The reaction of zinc chloride with alkylphenols in the presence of sodium alkoxide, e. g., butoxide, to produce zinc alkylphenolates has been suggested. These and other procedures heretofore proposed for the production of such metal salts of alkylphenols have a number of disadvantages among which may be mentioned (a) the necessity of pre-drying the solvents and the reactants, (b) the difficulty of separating the viscous solution of the zinc salt of alkylphenol from large amounts of finely divided sodium chloride precipitated in the reaction, and (c) relatively poor yields.

It is among the objects of this invention to provide a process for producing metal salts of phenols which process is relatively simple to carry out, can be carried out rapidly and results in substantially quantitative yields.

Another object of this invention is to provide a novel product consisting of a mixed metal salt of a phenol with a low molecular weight aliphatic acid.

Other objects and advantages of this invention will be apparent from the following detailed description thereof.

In accordance with this invention a phenol is reacted with a metal salt of a low molecular weight aliphatic acid producing a mixed metal salt of the phenol with a low molecular weight aliphatic acid. This mixed metal salt has the formula

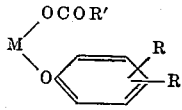

in which M is zinc or cadmium, R is hydrogen or an alkyl group preferably containing from 8 to 30 carbon atoms, and R' is methyl, ethyl, propyl or isopropyl. This mixed metal salt may be employed as such, as an oil additive, or reacted with a low molecular weight alcohol and a phenol to produce the desired metal diphenolate salt.

The reactions may be represented by the following equations:

EQUATION 1

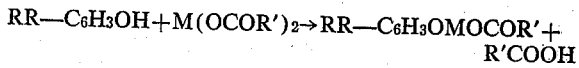

in which R is hydrogen or alkyl, M is zinc or cadmium and R' is a methyl, ethyl, propyl, or isopropyl radical.

EQUATION 2

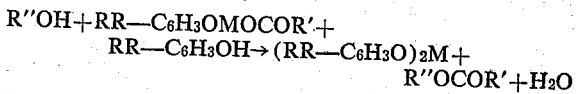

in which R and R' have the values above noted and R" is n-propyl, isopropyl, n-butyl, isobutyl, or the secondary butyl radical.

In carrying out the reaction represented by Equation 2, the amount of the phenol employed may be in excess of that required for the formation of the metal diphenolate salt leaving some of the phenol unreacted in the reaction mixture. This unreacted phenol may be reacted with the alkoxide of an alkali or alkaline earth metal, e. g., the methoxide, ethoxide or isopropoxide of magnesium, sodium, lithium, barium, strontium or calcium. A mixture of the metal salts of the phenol may be produced in this manner, e. g., the zinc or cadium and the magnesium or other alkaline earth or alkali metal salts of the phenol.

In the conduct of the first step of the process, equimolar amounts of the phenol and metal salt of the aliphatic acid may be used and additional amounts of the pehnol added later to provide the necessary amount of the phenol required for Step 2. Alternatively, sufficient of the phenol is mixed initially with the metal salt of the aliphatic acid so that enough is present to complete the second step. The alkylphenols used may be mixtures of alkylphenol isomers or alkylphenols having different alkyl substituents. The first step is carried out while agitating and under a pressure of less than 30 mm. of mercury absolute and at a temperature of 100° to 200° C., preferably from 150° to 190° C. In general a temperature of 150° to 170° C. is preferred when monoalkylphenols are employed, and a temperature of 180° to 190° C. is preferred when dialkylphenols are employed. The time of the reaction will depend on the phenol used and the metal salt of the aliphatic acid reacted therewith. Generally, this reaction may be completed in from about 2 to 9 hours, usually from about 4 to 6 hours. The metal salt of the aliphatic acid gradually dissolves in the phenol and substantially one mol of organic acid per mol of metal salt of the aliphatic acid is liberated and removed under vacuum.

Preferably, but not necessarily, an organic base, such as pyridine, quinoline, isoquinoline and their methyl or ethyl derivatives, such, for example, as the picolines, lutidines, quinaldine and lepidine, is added to the mixture of the phenol and metal salt of aliphatic acid employed in the first step. Such organic bases of the (1) pyridine, (2) quinoline and (3) isoquinoline types may be represented by the following formulae respectively:

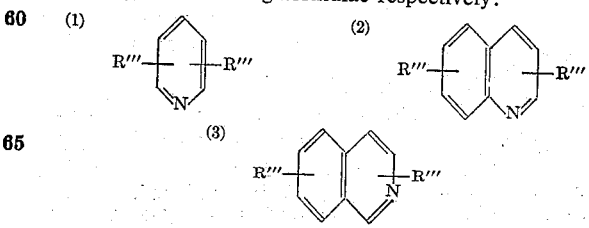

in all of which R''' is hydrogen, methyl or ethyl.

The organic base forms a complex salt with the metal salt of the aliphatic acid which complex salt dissolves immediately in the phenol. Both the organic base and the aliphatic acid are removed during the heating of the reaction mixture under vacuum. To insure complete removal of the organic base the reaction mixture is heated to at least 100° C. under an absolute pressure of from 5 to 10 mm. of mercury. It is important that the base be removed completely in order to obtain complete utilization of the metal salt of the aliphatic acid charged.

The phenol may have 1 or 2 hydrogens of the aromatic nucleus substituted by alkyl groups, i. e., the invention is applicable to the production of zinc or cadmium salts of mono- and dialkylphenols. The total number of carbon atoms in each alkyl group desirably is from 8 to 30, preferably 9 to 22.

As the metal salt of the aliphatic acid, zinc or cadmium acetate, propionate, n-butyrate or isobutyrate may be used, i. e., the metal salts of acetic, propionic, butyric and isobutyric acid may be employed in Step 1 of the process.

The reaction product resulting from Step 1 contains the mixed salt RR—$C_6H_3$OMOCOR' (R, M, and R' having the values above noted), and any excess phenol or alkylphenol including dialkylphenol which may be present in the reaction mixture. This product is fluid when hot, but a rubbery gel when cooled to room temperature, even when diluted with an equal weight of an inert hydrocarbon such as the lubricating oils AEO-120 (aircraft engine oil) or "300" Pale Oil. These reaction products form gels when diluted with equal weights of heptane and cooled to room temperatures. They are in suitable form for the second step of the reaction with or without the addition of an oil diluent such as a lubricating oil.

The second step of the process is carried out in the presence of a low molecular weight alcohol, such as n-propyl alcohol, isopropyl alcohol, n-butyl alcohol, isobutyl alcohol and secondary butyl alcohol, which forms a minimum-boiling azeotrope with water. The molar ratio of the free phenol to the mixed metal salt is adjusted, if necessary, so as to be equal to or greater than 1:1; if desired this molar ratio may be up to 3:1. The rubbery gel product of Step 1 is dissolved in approximately an equal volume of the alcohol at a temperature of 20° to 100° C., preferably 20° to 40° C. To the resulting solution is added, if necessary, the proper amount of the phenol required for the reaction to produce the diphenolate salt, and the solution filtered to remove any traces of insoluble material. The clear filtrate is then heated to boiling and distilled slowly at a still pot temperature of 120° to 160° C. to drive off the water and the ester of the alcohol and low molecular weight aliphatic acid. The mixed metal salt is thus converted to the metal diphenolate salt of the phenol. Preferably, the distillation of the reaction mixture is conducted so that the water of reaction is removed as it is formed during the continuous distillation of the alcohol and ester. The final traces of alcohol and ester are removed under a pressure of from 1 to 50 mm. of mercury, preferably from 5 to 10 mm. of mercury absolute at a still pot temperature of from 100° to 200° C., preferably at about 150° C.

The residual product, which is a viscous liquid the viscosity depending upon the particular divalent metal and the phenol reacted, is soluble in hydrocarbon oils and may be dissolved in such oil for storage or use. Such oil may, if desired, be present in the reaction mixture so that the reaction product is obtained as a solution of desired concentration of the metal salt in the oil solvent. Oils which may be used as solvents are the lubricating oils such as those above mentioned.

Prior to Step 1, the metal salt of the aliphatic acid may be added to the reaction mixture in the form of its hydrate. In this case the hydration of the metal salt is accomplished "in situ" at about 120° C., at a pressure of from 5 to 760 mm. of mercury absolute before the reaction temperature is raised to cause the reaction to take place. Operating at atmospheric pressure, it is preferred to use an entrainer such as benzene, toluene or xylene to aid in the dehydration. If an organic base is added to the reaction mixture during Step 1 and a hydrate of the metal salt is used, such dehydration of the salt is preferably accomplished before the organic base is added.

Instead of using the zinc or cadmium salt of the aliphatic acid, zinc or cadmium oxide may be mixed with the phenol or alkylphenol and a low molecular weight aliphatic acid added so that the zinc or cadmium salt is formed "in situ." Thus, for example, zinc oxide and acetic acid may be mixed with the phenol or alkylphenol and the zinc acetate formed and dehydrated "in situ" prior to the reaction hereinabove described which takes place during Step 1 of the process. It will be understood that the reference in the specification and claims to the metal salt of an aliphatic acid includes the addition of such salt as such as well as the formation of such salt in the reaction mixture.

The following examples illustrate the invention, but are not to be regarded as limiting it in any way. All pressures given are absolute pressures.

*Example 1.—Zinc salt of $C_{22}$ alkylphenol*

STEP 1

945 grams (2.1 mols) of "$C_{22}$" alkylphenol (a 5% excess over the stoichiometric amount) and 183.5 grams (1 mol) of anhydrous zinc acetate are heated at 160° to 170° C. for 6 hours at 5 to 10 mm. of mercury pressure while stirring the reaction mixture. During this time, acetic acid is liberated and substantially all of the zinc acetate dissolves. A mixed zinc salt of "$C_{22}$" alkylphenol and acetic acid results.

The reaction mixture is permitted to settle for one hour while cooling to 150° C. and is then divided into two equal portions which are worked up as described below to produce the zinc diphenolate of the "$C_{22}$" alkylphenol without handling the alkylphenoxy zinc acetate as a gel.

STEP 2

One portion of the hot reaction mixture is carefully decanted from the small amount of unreacted zinc acetate into an equal amount of butanol precooled to 5° C. while stirring and cooling to hold the temperature of the butanol solution at or below about 40° C. The butanol solution is filtered through coarse sintered glass and the filtrate is heated rapidly to boiling and the butanol distilled at atmospheric pressure to a maximum pot temperature of about 150° C. The pressure is then gradually reduced to 5 to 10 mm. of mercury while keeping the still pot temperature at about 150° C. and the remaining butanol completely removed. The product is a bright clear viscous liquid when cooled to room temperature and gives bright clear free-flowing solutions in concentrations of 50% to 1% in AEO-120 lubricating oil.

The other portion of the hot reaction mixture is cooled to 100° C., diluted with an equal volume of n-butyl acetate, cooled to about 35° C. and filtered through coarse sintered glass. The butyl acetate is removed from the filtrate by distillation first at atmospheric pressure and finally under 5 to 10 mm. of mercury and at a pot temperature of 150° C. An equal volume of butanol is added to the hot reaction mixture and removed by distillation in the same manner as above noted. The viscous clear product is extremely bright and gives bright clear solutions in the petroleum oil above noted.

The yield obtained in this example is 960 grams, which corresponds to approximately 100% on the basis of the zinc acetate employed.

Example II.—Zinc salts of dinonylphenol

STEP 1

724 grams (2 mols) of a commercial dinonylphenol and 72.8 grams (0.4 mol) of finely divided zinc acetate are heated and stirred vigorously at 180° to 190° C. under 5 to 10 mm. of mercury pressure for 3 hours. During this time, acetic acid is liberated and collected in a trap cooled by Dry Ice. At the end of the 3 hour reaction period the zinc acetate appears to have completely dissolved. A 20 gram portion of pyridine is then added to the hot reaction mixture at atmospheric pressure and vacuum then applied. Heating at 180° to 190° C. and a pressure of 5 to 10 mm. of mercury is continued for 6 hours longer at the end of which time no odor of pyridine is detectable in the hot reaction mixture. A cooled test sample consists of a stiff gel of a mixed zinc salt of dinonylphenol and acetic acid having the probable formula:

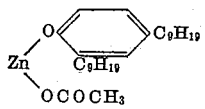

The reaction mixture is cooled to 100° C., diluted with 800 grams of n-butyl acetate and then cooled to 50° C. The fluid butyl acetate solution is filtered at 50° C. through coarse sintered glass to remove any traces of solids, after which the filtrate is freed of solvent by distillation, first at atmospheric pressure and then under 5 to 10 mm. of mercury pressure at 180° C.

STEP 2

750 grams of butanol are added to the hot still pot contents in a steady stream with controlled heat input so that the butanol begins to distill at atmospheric pressure almost immediately and continues to distill throughout its addition. The distillation of butanol is continued at atmospheric pressure at a rate of 5 to 10 cc. per minute until the pot temperature is about 160° C. The pressure is then gradually lowered to 5 to 10 mm. of mercury and the temperature increased to 180° C. to strip out the remaining volatile solvents. Butyl acetate and water formed are removed with the butanol. The reaction mixture is then cooled to room temperature. The product obtained is a bright clear mobile liquid miscible with lubricating oil in all proportions giving bright, clear solutions.

Example III.—Zinc salt of mononylphenol

STEP 1

45.8 grams (0.25 mol) of anhydrous zinc acetate and 115 grams (0.5 mol) of a commercial nonylphenol are heated at 150° C. with stirring for 5 hours and at 20 to 30 mm. of mercury pressure during which time acetic acid is evolved. 240 grams of lubricating oil (AEO–120) are added and the mixture cooled to room temperature. The resulting gel contains a mixed zinc salt of nonylphenol and acetic acid having the probable formula

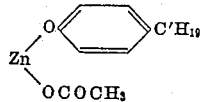

STEP 2

The gel is dissolved in an equal volume of butanol at room temperature, filtered and treated as in Step 2 of Example II to produce the zinc salt of nonylphenol.

Example IV.—Zinc salt of dodecylphenol

STEP 1

45.8 grams (0.25 mol) of anhydrous zinc acetate and 135 grams (0.5 mol) of dodecylphenol are heated at 150° C. with stirring at 5 to 10 mm. of mercury pressure for 4 hours during which time acetic acid is evolved. 475 grams of lubricating oil of the same type as used in the preceding example are added and the mixture cooled to room temperature.

STEP 2

The resulting gel is dissolved in an equal volume of butanol, filtered and treated as in Step 2 of Example II to produce the zinc salt of dodecylphenol. 553 grams of a clear oil concentrate is obtained containing approximately 24% by weight of zinc salt of dodecylphenol.

Example V.—Zinc salt of octadecylphenol

STEP 1

45.8 grams (0.25 mol) of anhydrous zinc acetate and 168 grams (0.5 mol) of octadecylphenol are heated to 150° C. with stirring at 5 to 10 mm. of mercury pressure for 2 hours during which time acetic acid is evolved. 170 grams of lubricating oil of the same type as used in the preceding example are added and the mixture cooled to room temperature.

STEP 2

The resulting gel is dissolved in an equal volume of butanol, the solution filtered and treated to produce the zinc salt of octadecylphenol following the procedure of the preceding examples. 360 grams of an oil concentrate is obtained which is approximately 49.4% by weight of the zinc salt of octadecylphenol.

Example VI.—Cadmium salt of dodecylphenol

STEP 1

66.6 grams (0.25 mol) of cadmium acetate dihydrate and 56 grams (0.55 mol) of acetic anhydride are refluxed for 2 hours. Thereafter the acetic acid and excess acetic anhydride are removed at 5 to 10 mm. of mercury pressure, the temperature in the still-pot not exceeding 120° C. 135 grams (0.5 mol) of dodecylphenol are added and the reaction mixture heated at 170° C. under 5 to 10 mm. of mercury pressure while stirring for 9 hours.

STEP 2

177 grams of lubricating oil of the same type as used in the other examples are added and the mixture cooled to room temperature, dissolved in 500 cc. of butanol and filtered. The butanol solution is processed in the same manner as the butanol solution of zinc salt in the preceding examples. The resulting oil concentrate is diluted with an equal volume of heptane and centrifuged to remove traces of solids. The heptane is removed by distillation and there is obtained 326 grams of an oil concentrate containing about 48% of the cadmium salt of dodecylphenol.

Example VII.—Mixture of zinc and magnesium salts of dinonylphenol

STEP 1

278 grams (0.75 mol) of a commercial dinonylphenol and 22.9 grams (0.125 mol) of anhydrous zinc acetate are heated at 160° to 170° C. at 5 to 10 mm. pressure for 13 hours while stirring. 10 cc. of pyridine is then added and the reaction mixture heated and stirred at 100° to 120° C. and atmospheric pressure for a few minutes until all solid disappears, then heated while stirring at 160° to 170° C. at 5 to 10 mm. pressure for 3 hours.

STEP 2

The reaction mixture from Step 1 is cooled to room temperature, dissolved in 500 cc. of n-butanol and filtered to remove a trace of crystalline solids. The filtrate is heated at atmospheric pressure to distill butanol, water and butyl acetate from the reaction mixture. Final traces of volatile materials are distilled over at 5 to 10 mm. pressure. The product thus produced contains about 33% zinc salt of dinonylphenol.

To this product is added 232 cc. of a methanol solution of magnesium methoxide containing 0.024 gram of magnesium per cc. (0.2375 mol, i. e. 95% of the theoretical amount required for reaction with residual unreacted dinonylphenol). Some solid separates, but is readily redissolved as the reaction mixture is heated and methanol removed by distillation at atmospheric pressure. After removal of the methanol the reaction mixture is heated at 150° to 160° C. for 2 hours at 5 to 10 mm. pressure. 278 grams of "300" Pale Oil is then added and heating and stirring continued one hour longer under vacuum. A viscous liquid is obtained containing approximately 16% zinc dinonylphenolate and about 33% magnesium dinonylphenolate; this liquid has considerable gel structure. It becomes free flowing upon dilution with Pale Oil to a concentration of about 25% of the mixture of zinc and magnesium salts of dinonylphenol.

*Example VIII.—Mixture of zinc and magnesium salts of dinonylphenol involving use of zinc acetate hydrate in Step 1*

STEP 1

199 grams (0.55 mol) of a commercial dinonylphenol is mixed with 18.3 grams (0.0834 mol) of zinc acetate dihydrate and 3 grams of acetic acid, stirred and heated at about 105° to 110° C. at atmospheric pressure for one hour and then at 5 to 10 mm. pressure for one hour longer to remove water and excess acetic acid. The reaction temperature is then raised to 160° to 170° C. at 5 to 10 mm. pressure and held for 4 hours. 10 cc. of pyridine is then added and heating continued at atmospheric pressure for a few minutes to dissolve traces of unreacted zinc acetate. The reaction product is then stripped at 160° to 170° C. and 5 to 10 mm. pressure and thereafter cooled to about 25° C.

STEP 2

The product from Step 1 is dissolved in 200 cc. of butanol, the solution filtered to remove a trace of gel and the filtrate stripped of butanol for 2 hours, first at atmospheric pressure and about 125° C. still-pot temperature and finally at 160° to 170° C. and 5 to 10 mm. pressure to yield a bright, clear solution of the zinc salt of dinonylphenol in excess dinonylphenol. To this solution is added 167 cc. of a methanol solution of magnesium methoxide (0.0254 gram of magnesium per cc.), during which addition some solid separates. The methanol is then stripped, first at atmospheric pressure to a still pot temperature of 150° C. and then at 5 to 10 mm. pressure for 1 hour at 160° to 170° C. The reaction mixture becomes clear during the process. 183 grams AEO-120 lubricating oil is added and the mixture heated at 160° to 170° C. under vacuum for 6 hours. 400 grams of product is obtained containing approximately 16% zinc salt of dinonylphenol and 33% magnesium salt of dinonylphenol.

*Example IX.—Zinc salt of octadecyl phenol involving use of zinc propionate in Step 1*

STEP 1

52.7 grams (0.25 mol) of anhydrous zinc propionate (prepared by treating zinc oxide with excess propionic acid, treating the resulting mixture with propionic anhydride to remove the water, and heating this product in vacuo to remove propionic acid) is mixed with 168 grams (0.5 mol) of octadecylphenol and the mixture is heated to about 160° C. under 5 to 10 mm. pressure. The reaction mixture is stirred and held at about 160° C. under vacuum for about 3 hours during which time propionic acid is formed and evolved. To the resulting hot reaction mixture of octadecylphenol with the mixed zinc salt of octadecylphenol and propionic acid, 170 grams of AEO-120 (a lubricating oil) is added; this mixture is then permitted to cool to about 25° C. The cooled solution is a rubbery gel.

STEP 2

The gel from Step 1 is dissolved in about 250 grams of anhydrous n-butanol with stirring and the resulting solution is filtered to remove traces of insoluble matter. The clarified solution is then rapidly heated to boiling. Distillation of the butanol is permitted to continue at atmospheric pressure until the pot temperature reaches 150° C. The pressure is then gradually reduced finally to about 5 to 10 mm. while the pot temperature is maintained at about 150° C. During the course of the distillation butanol, water, and butyl propionate are collected as distillate. The pot temperature is finally raised to about 175° C. at 5 to 10 mm. pressure for a few minutes to complete the removal of volatile material. The reaction mixture is then cooled to room temperature and is a bright, clear oil solution containing about 49.5% by weight zinc salt of octadecylphenol.

In the above examples involving the production of the zinc salts, instead of zinc acetate, zinc acetate dihydrate may be used with identical results. The zinc acetate dihydrate is dehydrated "in situ" during the heating up process under 5 to 10 mm. of mercury pressure before the ultimate reaction temperature is attained.

The mixed metal salts of the phenols and aliphatic acid can be employed as such, as oil additives, or as thickeners for hydrocarbons and need not be converted to the diphenolate salts as in the above examples. Thus, the mixed metal salts of this invention have the ability to thicken and gel several times their volume of aliphatic hydrocarbons such as heptane, or lubricating oil fractions.

It is to be understood that this invention is not restricted to the present disclosure otherwise than as defined by the appended claims.

What is claimed is:

1. The method of producing a metal salt of an alkyl phenol, which method comprises reacting at a temperature of from 100° to 200° C. and under a pressure of less than 30 mm. of mercury, an alkyl phenol with a metal salt of an aliphatic acid from the group consisting of acetic, propionic, n-butyric and isobutyric acids to produce a mixed metal salt of the phenol and the said acid, said metal being selected from the group consisting of zinc and cadmium, and reacting at a temperature of from 120° to 160° C. the said mixed metal salt with an alcohol from the group consisting of n-propyl alcohol, isopropyl alcohol, n-butyl alcohol, isobutyl alcohol and secondary butyl alcohol and the alkyl phenol to produce said metal salt of the alkyl phenol.

2. The method of producing a metal salt of an alkylphenol the alkyl group of which contains from 8 to 30 carbon atoms, which comprises reacting at a temperature of from 100° to 200° C. and under a pressure of less than 30 mm. of mercury the alkylphenol with a salt of a metal from the group consisting of zinc and cadmium and of an acid from the group consisting of acetic, propionic, n-butyric and isobutyric acids to produce a mixed metal salt of said alkylphenol with the said acid, and reacting said mixed metal salt at a temperature of from 120° to 160° C. with an alcohol from the group consisting of n-propyl alcohol, isopropyl alcohol, n-butyl alcohol, isobutyl alcohol and secondary butyl alcohol and said alkylphenol to produce said metal salt of the alkylphenol.

3. The method as defined in claim 2, in which an organic base from the group consisting of pyridine, quinoline, isoquinoline, their methyl and ethyl derivatives, is added to the reaction mixture consisting of alkylphenol and the said metal salt of the said acid.

4. The method as defined in claim 2, in which an excess of alkylphenol over and above the amount required to react with the said metal salt of the acid to produce the mixed metal salt is employed and this excess is reacted with the said mixed metal salt and alcohol to produce the desired metal salt of alkylphenol.

References Cited in the file of this patent

UNITED STATES PATENTS 2,322,307    Neely et al.    June 22, 1943
2,646,402    Hutcheson et al.    July 21, 1953